United States Patent [19]

Joy, III et al.

[11] Patent Number: 4,849,399

[45] Date of Patent: Jul. 18, 1989

[54] CATALYST FOR THE REDUCTION OF THE IGNITION TEMPERATURE OF DIESEL SOOT

[75] Inventors: George C. Joy, III, Arlington Heights; Edwin H. Homeier, Maywood, both of Ill.

[73] Assignee: Allied-Signal Inc., Morristown, N.J.

[21] Appl. No.: 190,318

[22] Filed: May 5, 1988

Related U.S. Application Data

[63] Continuation-in-part of Ser. No. 39,138, Apr. 16, 1987, Pat. No. 4,759,918.

[51] Int. Cl.$^4$ .................. B01J 21/04; B01J 23/42; B01J 23/44; B01J 23/46
[52] U.S. Cl. ..................... 502/333; 502/325; 502/332; 502/334; 502/339; 502/527; 423/215.5
[58] Field of Search ............... 502/325, 332, 333, 334, 502/339; 423/213.5, 215.5

[56] References Cited

U.S. PATENT DOCUMENTS 3,565,830 2/1971 Keith et al. .................. 502/334 X
4,483,940 11/1984 Ono et al. ..................... 502/159

*Primary Examiner*—W. J. Shine
*Attorney, Agent, or Firm*—Harold N. Wells; Thomas K. McBride; Frank S. Molinaro

[57] ABSTRACT

This invention relates to a catalytic composite and a process for reducing the ignition temperature of diesel soot. The process comprises contacting an exhaust gas from a diesel engine, which exhaust contains diesel soot, with a catalytic composite. The composite comprises a sulfur resistant refractory inorganic oxide selected from the group consisting of titania, zirconia, silica, silica-alumina and alumina which has been treated to be sulfur resistant, i.e. alumina treated with titania, zirconia, etc. which has deposited thereon at least one catalytic element selected from the group consisting of Pt, Pd and Rh. The inorganic oxide may be deposited on ceramic or metallic traps.

10 Claims, No Drawings

CATALYST FOR THE REDUCTION OF THE IGNITION TEMPERATURE OF DIESEL SOOT

CROSS-REFERENCE TO RELATED APPLICATIONS

This application is a continuation-in-part of prior copending application, Ser. No. 039,138, filed Apr. 16, 1987, now U.S. Pat. No. 4,759,918.

BACKGROUND OF THE INVENTION

Diesel engines enjoy an advantage over gasoline engines in that the diesel engines are much more fuel efficient than gasoline engines. It is well known that the gaseous waste products, hydrocarbons, carbon monoxide and nitrogen oxides, from gasoline engines pose a serious health problem to the population at large. In addition to these gaseous pollutants, diesel engines also emit "soot" particles comprising carbonaceous solids containing adsorbed hydrocarbons and inorganic compounds or very fine droplets of condensate or a conglomerate of the two "particulates". The "particulates" referred to herein as "diesel soot" are particularly rich in condensed polynuclear hydrocarbons, some of which have been found to be carcinogenic. Owing to these factors, the United States Environmental Protection Agency (EPA) has promulgated strict standards to minimize the discharge of diesel soot from automotive sources, including buses and trucks, into the atmosphere. California has also enacted regulations regarding emission of diesel soot from stationary sources.

Several approaches have been proposed to try to solve the diesel emission problem. Among these are: (1) electrostatic precipitators; (2) paper filters; (3) ceramic filters; (4) metal mesh filters; and (5) engine modifications. Electrostatic precipitators are too bulky and require too much energy to operate and are therefore impractical. Similarly, paper filters require frequent replacement and are extremely bulky. Engine modifications are capable of reducing the soot emissions, but not to the point where all vehicles can meet all the emission standards. The reason for this is that modifications which reduce the soot emissions generally increase the nitrogen oxides emissions or reduce the practical operation of the engine.

Ceramic and metallic filters have proven to be the best technology available to deal with this problem. The literature also shows that ceramic filters are preferred over metallic filters because the ceramic filters are apparently more durable. Ceramic filters have been described in the prior art and can be divided into two categories: (1) foam type and (2) honeycomb wall-flow type. Ceramic foam filters have been described in U.S. Pat. No. 4,083,905 and Society of Automotive Engineering Paper #830082. This type of filter is prepared by depositing a ceramic material onto an organic sponge and sintering said sponge at a high temperature to burn out the organic sponge material.

The honeycomb wall-flow type filters are very similar to the honeycomb substrates used as catalyst structural supports for gasoline engine pollution control applications, except that alternate flow channels are closed on each face of the substrate. The channels are plugged in such a manner that a channel open on one face is closed at the opposite face. Such filters are called "wall-flow filters" because the exhaust flows down a channel and must go through the walls of the channels, which are macroporous, in order to exit. These filters are described in U.S. Pat. Nos. 4,329,162, 4,340,403, 4,364,760 and 4,423,090. These wall-flow filters have been used more extensively than the foam filters because the wall-flow filters more efficiently trap the diesel soot.

Another type of filter which can be used is a conventional automotive catalyst carrier. That is, ceramic honeycomb monolithic carriers or particulate, e.g., spheres, pellets, and extrudates, carriers. The efficiency of these filters is not very high, but they may be used in applications where only a small reduction in particulate emissions is needed to meet the EPA standards.

The biggest drawback to these filters is that the diesel soot accumulates, clogging the filter, thereby causing an undesirable backpressure on the engine. The reason for this accumulation is that diesel soot ignites at about 650° C., but the maximum exhaust temperature in a diesel vehicle is only about 300°-400° C. Therefore, the diesel soot continues to build up and causes excessive backpressure on the engine which results in a decrease in fuel economy and eventually may cause damage to the engine.

It should be noted that conventional automotive catalyst carriers do not build up as much backpressure as the metal mesh and ceramic filters, because of their design and low trapping efficiency. To alleviate the backpressure problem, the diesel soot must be burned off. This is referred to as trap regeneration. There are two ways known in the art to burn or ignite the diesel soot collected on these filter traps. First, an external means of heat can be applied to the filter so that the temperature of the filter is raised high enough to initiate soot combustion and thus regenerate the filter. Second, the filter can be coated with a catalytic element that will lower the combustion temperature of the diesel soot.

The first approach has many disadvantages including: (1) reduction of fuel economy; (2) complexity of the control system; and (3) reliability of the overall system. In contrast, the second approach is much simpler and more reliable. The major problem with the second approach is developing a catalytic composite which lowers the ignition temperature of the diesel soot so that combustion of the diesel soot occurs continuously during normal operating conditions. Even though a catalytic composite may not be active enough to allow continuous combustion of the soot, it may be used in conjunction with external means of regenerating the filter.

In addition to igniting the diesel soot, most catalytic composites will also convert the sulfur oxides in the exhaust of sulfates or sulfuric acid. Although this problem is present in gasoline powered engines, it is particularly troublesome in diesel applications for two reasons. First, diesel fuel typically contains at least ten timess more sulfur than gasoline fuel. Second, the low temperature of the diesel exhaust facilitates the production and storage of sulfates and sulfuric acid. During high temperature modes such as trap regenerations, the sulfates and sulfuric acid are released and contribute to the total particulate emissions.

It is recognized that noble metals, especially platinum, can oxidize gaseous hydrocarbons but also promote the conversion of sulfur oxides to sulfates. U.S. Pat. No. 4,617,289 claims to solve this problem by adding large amounts of vanadium oxide ($V_2O_5$) to minimize the sulfate formation.

The prior art teaches that platinum or other noble metals are not a preferred metal for combusting diesel soot unless a promoter is used. For example, see U.S. Pat. No. 4,617,289 and references therein. Additionally, other patents teach that platinum should be used only for converting the gaseous hydrocarbon and other elements such as chromium, silver, etc. are to be used for igniting the soot. For example, U.S. Pat. No. 4,303,552 teaches the use of platinum and a bulk component selected from the group consisting of an element of the first transition series, silver and hafnium deposited on an inorganic oxide, preferably alumina.

Further, U.S. Pat. Nos. 4,515,758 and 4,588,707 teach the use of rhenium plus substances such as lithium oxide, copper chloride, vanadium oxide and optionally a noble metal. Again the noble metal is used only for treating the gaseous emissions. These patents also teach that the soot burning elements, i.e. rhenium, lithium oxide, etc. are deposited on an inorganic oxide support such as alumina, titania, etc. It is also known that supports such as titania or zirconia have sulfur reistant properties. For example, see U.S. Pat. No. 4,350,613.

In contrast to the prior art the present invention provides a catalytic composite effective in reducing the ignition temperature of diesel soot, which catalyst consists of a sulfur resistant refractory inorganic oxide such as titania, zirconia, etc. having dispersed thereon at least one catalytic element selected from the group consisting of Pt, Pd and Rh. This catalytic composite may be deposited on a number of types of diesel soot filters. The difference between this catalytic composite and that of the prior art is that the catalytic composite of the present invention uses only a Pt, Pd or Rh component to combust the soot, whereas the prior art catalytic composites use a bulk component such as chromium, silver, etc. to combust the soot. Also, the catalytic composite of the present invention uses a sulfur resistant support such as titania, which does not store as much sulfate as prior art supports. The catalytic composite of the present invention also ignites the soot at lower temperatures than prior art catalysts.

The present invention also provides a process for reducing the ignition temperature of diesel soot comprising contacting an exhaust gas from a diesel engine with the catalytic composite described above.

SUMMARY OF THE INVENTION

This invention relates to a catalyst and a process for reducing the ignition temperature of diesel soot in an exhaust gas from a diesel engine. Thus one embodiment is a catalytic composite effective in reducing the ignition temperature of diesel soot in an exhaust gas from a diesel engine consisting essentially of a diesel soot filter selected from the group consisting of ceramic foam filter, monolithic honeycomb ceramic wall-flow filter, metallic mesh filter and metallic ribbon filter having deposited thereon at least one sulfur resistant refractory inorganic oxide selected from the group consisting of titania, zirconia, alumina treated with titania, alumina treated with zirconia, and mixtures thereof having deposited thereon at least one catalytic metal selected from the group consisting of Pt, Pd and Rh.

Another embodiment is a process for reducing the ignition temperature of diesel soot in an exhaust gas from an internal combustion diesel engine comprising contacting said exhaust with a catalytic composite consisting essentially of a particulate filter having deposited thereon at least one sulfur resistant refractory inorganic oxide selected from the group consisting of titania, zirconia, alumina treated with titania, and alumina treated with zirconia, having deposited thereon at least one catalytic metal selected from the group consisting of Pt, Pd and Rh.

Accordingly, one specific embodiment of the invention is a catalytic composite consisting essentially of a ceramic honeycomb wall-flow filter coated with a layer of a titania support and having dispersed thereon a platinum component.

Another specific embodiment of the invention comprises a process for reducing the ignition temperature of diesel soot in an exhaust gas from a diesel engine, said exhaust gas containing at least carbon monoxide, hydrocarbons, nitrogen oxides, soot particles and sulfur oxides. The process comprises contacting said exhaust with a catalytic composite consisting essentially of a ceramic honeycomb wall-flow filter coated with a layer of a titania support and having dispersed thereon a platinum component.

Other objects and embodiments will become more apparent after a more detailed description of the invention.

DETAILED DESCRIPTION OF THE INVENTION

As heretofore indicated, the present invention relates to a catalytic composite and a process for reducing the ignition temperature of diesel soot in an exhaust gas from a diesel engine.

The catalytic composite consists essentially of a diesel soot filter selected from the group consisting of ceramic foam filter, monolithic honeycomb ceramic wall-flow filter, metallic mesh filter and metallic ribbon filter having deposited thereon at least one sulfur resistant refractory inorganic oxide selected from the group consisting of titania, zirconia, alumina treated with titania, alumina treated with zirconia, and mixtures thereof having dispersed thereon at least one catalytic component selected from the group consisting of Pt, Pd and Rh.

It is a preferred embodiment to deposit the inorganic oxide onto a diesel soot or particulate filter. Diesel soot filters may be chosen from either metallic filters or ceramic filters. Metallic filters include metallic mesh filters and metallic ribbon filters. Ceramic filters include foam filters and monolithic honeycomb wall-flow filters.

When ceramic filters are employed, it is important that the ceramic material be inert and therefore unreactive with the refractory inorganic oxide coating and with the gas to which it is exposed. Examples of suitable ceramic materials include sillimanite, petalite, cordierite, mullite, zircon, zircon mullite, spodumene, alumina, alumina-titanate, etc.

The desired ceramic or metallic diesel soot filter can be washcoated using a slurry or dispersion of one or more sulfur resistant refractory inorganic oxides. The preparation of slurries and methods of washcoating a filter element with a slurry are well known in the art. For example, the appropriate amount of oxide is combined with water and an acid such as nitric, hydrochloric, sulfuric acid, etc. The resultant slurry is milled for 2 to 6 hours and then used to deposit a thin film or washcoat onto a filter substrate. The quantity of washcoat to be applied to a filter element is less critical with regard to the lower limit than with regard to the upper limit. Generally a minimum amount will be when the filter element contains about 0.20 grams of washcoat per cubic inch of filter volume. The upper range is limited by the maximum permissible backpressure which the filter exerts on the diesel engine. Accordingly, an appropriate range is from about 0.2 g/in$^3$ to about 3.5 g/in$^3$ with a preferred range being from about 0.8 g/in$^3$ to about 2.5 g/in$^3$.

In a preferred embodiment of the invention titania is used as the inorganic oxide support. The titania support has a specific surface area ranging from about 1 to about 200 m$^2$/g and more preferably ranges from about 25 to about 100 m$^2$/g. A slurry can be prepared by combining the appropriate amount of titania with water and nitric acid. The resultant slurry is milled for 2 to 6 hours and used to deposit a thin film or washcoat of titania on the filter element, e.g. wall-flow ceramic filter. It is preferred that the washcoat deposit be present on the filter element in an amount in the range from about 0.8 g/in$^3$ to about 2.5 g/in$^3$.

The catalytic element can be dispersed onto a sulfur resistant refractory inorganic support by conventional methods found in the prior art. One method involves impregnating the filter element which has been coated with a sulfur resistant refractory inorganic oxide with a water soluble decomposable compound of the appropriate catalytic element, calcining in air the resultant impregnated filter element at a temperature of about 350° to about 650° C. for about 1 to about 4 hours, optionally reducing the catalytic element with a reducing agent well known in the art and recovering the resultant catalytic composite. By decomposable compound is meant a compound which on heating in air decomposes to the appropriate metal or metal oxide. Alternatively the sulfur resistant refractory inorganic oxide can first be impregnated with a water soluble decomposable compound of the appropriate catalytic element, the resultant mixture calcined at a temperature of about 350° to about 650° C. for about 1 to about 4 hours in air, optionally reducing the dispersed catalytic element with a reducing agent known in the art, preparing a slurry from the resultant catalytically active oxide support and depositing said support onto a filter element. It is to be noted, however, that the two methods of preparation may not give equivalent results.

For example, a filter element that has been coated with a titania washcoat is impregnated with an aqueous solution of chloroplatinic acid, Subsequently, the impregnated filter element is dried and calcined at a temperature of about 450° to about 550° C. in air. Other water soluble decomposable platinum compounds or complexes may be employed to prepare the impregnation solution. These include ammonium chloroplatinate, bromoplatinic acid, platinum trichloride, platinum tetrachloride hydrate, platinum dichlorocarbonyl dichloride, dinitrodiamino platinum, and sodium tetranitroplatinate.

Utilization of a platinum compound such as chloroplatinic acid is ordinarily preferred. Hydrogen chloride, nitric acid or other suitable materials may be added to the solution in order to further facilitate the uniform distribution of the metallic components throughout the titania support material. The platinum metal is present in an amount from about 5 to about 250 g of platinum per cubic foot of volume of particulate filter or in terms of weight percent of the inorganic oxide from about 0.1 to about 4.0%.

If a palladium component is desired, the palladium component may be impregnated by utilizing an aqueous solution of chloropalladic acid. Other water soluble compounds or complexes of palladium may be employed such as palladium chloride, palladium nitrate, palladium dioxide, diamminopalladium hydroxide, and tetramminepalladium chloride. The palladium is present in an amount from about 5 to about 250 g of palladium per cubic foot of volume of particulate filter or in terms of weight percent of the inorganic oxide from about 0.1 to about 4.0%.

Alternatively, if a rhodium component is desired, the rhodium component may be impregnated by utilizing an aqueous solution of rhodium trichloride. Other water soluble compounds of complexes of rhodium may be employed such as hexamminerhodium chloride, rhodium carbonylchloride, rhodium trichloride hydrate, rhodium nitrate, sodium hexachlororhodate, and sodium hexanitrorhodate. The rhodium is present in an amount from about 2 to about 70 g of rhodium per cubic foot of volume of particulate filter, or in terms of weight percent of the inorganic oxide from about 0.03 to about 1.2%.

The essential feature of the present invention is the combination of a sulfur resistant refractory oxide support and a noble metal catalytic element deposited on a diesel soot filter. Diesel fuel contains large amounts of sulfur compounds which are converted to sulfur oxides during the combustion process. Since a diesel exhaust environment virtually always contains excess oxygen, compounds such as sulfur dioxide ($SO_2$) can react with the oxygen over the catalyst to yield sulfites or sulfates. The sulfites or sulfates in turn can react with a conventional refractory inorganic oxide such as alumina to form stable sulfates, i.e. $Al_2(SO_4)_3$. The result is that catalyst activity quickly deteriorates. Alumina can accumulate sulfates, which are then released when the temperature is raised. This causes the undesirable release of a sulfuric acid particulate mist.

It is known in the art that refractory oxides such as titania and zirconia do not form stable sulfates under gasoline fueled engine exhaust. Therefore, one would expect less sulfate storage and better durability for diesel applications. However, as will be shown in greater detail, the use of titania or zirconia in combination with a noble metal catalytic element such as platinum, results in an unexpected improvement in the ability of the catalytic composite to more completely combust diesel soot at normal diesel exhaust temperatures versus using an alumina support.

As stated in the Background section for certain limited applications, conventional automotive carriers may be used to filter diesel soot. For example, conventional honeycomb monolithic carriers (no channels blocked off) can be coated with a sulfur resistant inorganic oxide support and dispersing on said support at least one catalytic element as described above. Further, the inorganic oxide support may be formed into shapes such as pellets, spheres, extrudates, etc. and depositing at least one catalytic element thereon as described above.

As heretofore indicated, the present invention also relates to a process for reducing the ignition temperature of diesel soot. The process comprises contacting said exhaust with a catalytic composite consisting essentially of a particulate filter having deposited thereon at least one sulfur resistant refractory inorganic oxide selected from the group consisting of titania, zirconia, alumina treated with titania, oxide, and alumina treated with zirconia, having deposited thereon at least one catalytic element or compound selected from the group consisting of Pt, Pd and Rh.

In order to more fully illustrate the advantages to be derived from the instant invention, the following examples are set forth. It is to be understood that the examples are by way of illustration only and are not intended as an undue limitation on the broad scope of the invention as set forth in the appended claims.

EXAMPLE I

In order to facilitate obtaining data, all measurements were conducted on conventional honeycomb substrates, i.e. all flow channels open, instead of wall-flow honeycomb substrates. A special procedure was also developed to accurately determine the activity of the various catalytic composites. The first part of the procedure involved depositing diesel soot onto the catalytic composite. A catalytic composite was placed in a demountable catalyst holder and placed in the exhaust of a diesel vehicle which was driven over a prescribed cycle on a chassis dynamometer. The diesel vehicle used for this purpose was a 1977 International Harvester diesel Scout equipped with an indirect injected 3.2 liter six cylinder engine. Commercial number two diesel fuel was used to run the vehicle.

The driving cycle which was used to deposit the soot onto the catalytic composite is described in Table 1. The maximum temperature at the inlet of the catalytic composite was maintained at 288° C. by adjusting the dynamometer load. The cycle was run for 48 hours.

TABLE 1

| Diesel Soot Deposition Cycle | | | |
|---|---|---|---|
| Mode | Speed (MPH) | Time (Seconds) | Inlet Temperature (°C.) |
| 1 | Idle | 15 | 149 Average |
| 2 | Idle-24 | 14 | 193 Peak |
| 3 | 24–Cruise | 13 | 182 Average |
| 4 | 24–20 | 11 | 171 Minimum |
| 5 | 20–35 | 21 | 254 Peak |
| 6 | 35 | 44 | 240 Average |
| 7 | 35–20 | 17 | 177 Minimum |
| 8 | 20 | 10 | 177 |
| 9 | 20–Idle | 8 | 149 Minimum |
| 10 | Idle | 10 | 149 |
| 11 | Idle-40 | 17 | 288 Peak |
| 12 | 40 | 40 | 288 |
| 13 | 40–Idle | 20 | 149 Minimum |

The second part of the procedure involved evaluating the activity of the catalytic composite in a laboratory test apparatus after the soot was deposited. Cylindrical cores measuring 2.22 cm in diameter by 1.27 cm high, were drilled and cut from the catalytic composite after the 48 hour sooting cycle. A slice was placed in a reactor which in turn was placed in a vertical furnace. A synthetic gas feed was flowed over the solid catalyst slice being tested. The feed gas composition was selected to simulate a highly oxidizing diesel exhaust gas except that $CO_2$ was absent. This gas composition is summarized in Table 2.

TABLE 2

| Simulated Laboratory Exhaust Gas[a] | |
|---|---|
| Component | Concentration |
| $C_3H_8$ | 300 ppm |
| $CO_2$ | 0 |
| CO | 0 |
| $H_2$ | 0 |
| $O_2$ | 10% |
| NO | 100 ppm |

TABLE 2-continued

| Simulated Laboratory Exhaust Gas[a] | |
|---|---|
| Component | Concentration |
| $SO_2$ | 50 ppm |
| $N_2$ | Balance |

[a]Dry basis. 10% steam added at the reactor.

With this simulated exhaust flowing over the catalyst, the temperature at the catalyst inlet position was increased from 120° C. to 750° C. at 15° C./minute with 15 minute holds at 300, 350, and 400° C. The analysis of the product gas for CO, $CO_2$, $C_3H_8$ and $O_2$ permitted determination of soot-carbon (i.e., carbon and adsorbed hydrocarbon) burning rate versus the inlet temperature.

EXAMPLE II

A conventional catalytic composite was prepared by the following method. A dilute solution of nitric acid ($HNO_3$) was prepared by adding 285 g of concentrated nitric acid to a container which contained 8000 mL of deionized water. This solution was stirred and to it there were added 5300 grams of gamma alumina. The resultant slurry was ball milled for 2.0 hours. An oval shaped cordeierite monolith with a minor axis of 3.2 inches, a major axis of 5.7 inches, a length of 5 inches and having 400 square channels per square inch of facial area was dipped into the slurry. After dippping, the excess slurry was blown out with an air gun. The slurry coated monolith was calcined for about 2 hours at 540° C. The above described dipping, blow out and calcining steps were repeated until the monolith contained 1.5 g of alumina per cubic inch of monolith volume.

Next the platinum metal was impregnated onto the above-described washcoated monolith. The above-described monolith was dipped into an auqoue solution containing 1.7 g of chloroplatinic acid. After dipping, the excess solution was blown out with an air gun and calcined for about 2 hours at 540° C. This catalytic composite was designated Catalyst A. Analysis of this composite showed a platinum content of 15 g Pt per cubic foot of support.

EXAMPLE III

An experimental catalytic composite was prepared by the following method. A dilute solution of nitric acid ($HNO_3$) was prepared by adding 28.1 g of concentrated nitric acid to a container which contained 9100 mL of deionized water. This solution was stirred and to it there were added 3600 grams of titania. The resultant slurry was ball milled for 3 hours. An oval shaped cordierite monolith with a minor axis of 3.2 inches, a major axis of 5.7 inches, a length of 5 inches and having 400 square channels per square inch of facial area was dipped into the above-described slurry. After dipping, the excess slurry was blown out with an air gun. The slurry coated monolith was calcined for about 1 hour at 540° C. The above-described dipping, blow-out and calcining steps were repeated until the monolith contained 1.5 g per cubic inch of monolith volume.

Next the platinum metal was impregnated onto the abovedescribed washcoated monolith. The above-described monolith was dipped into an aqueous solution containing 1.7 g of chloroplatinic acid. After dipping, the excess solution was blown out with an air gun and calcined for about 2 hours at 540° C. This catalytic composite was designated Catalyst B. Analysis of this composite showed a platinum content of 17 g Pt per cubic foot of support. The platinum content of this composite is equivalent to that of Catalyst A within experimental error of the analysis.

EXAMPLE IV

A dilute solution of nitric acid ($HNO_3$) was prepared by adding 285 g of concentrated nitric acid to a container which contained 8000 mL of deionized water. This solution was stirred and to it there were added 5300 grams of gamma alumina. The resultant slurry was ball milled for 2.0 hours. An oval shaped cordierite monolith with a minor axis of 3.2 inches, a major axis of 5.7 inches, a length of 5 inches and having 400 square channels per square inch of facial area was dipped into the above-described slurry. After dipping, the excess slurry was blown out with an air gun. The slurry coated monolith was calcined for about 1 hour at 540° C. The above-described dipping, blowout and calcining steps were repeated until the monolith contained 1.5 g per cubic inch of monolith volume. This sample was designated Sample C.

EXAMPLE V

A dilute solution of nitric acid ($NHO_3$) was prepared by adding 28.1 g of concentrated nitric acid to a container which contained 9100 mL of deionized water. This solution was stirred and to it there were added 3600 grams of titania. The resultant slurry was ball milled for 3 hours. An oval shaped cordierite monolith with a minor axis of 3.2 inches, a major axis of 5.7 inches, a length of 5 inches and having 400 square channels per square inch of facial area was dipped into the above-described slurry. After dipping, the excess slurry was blown out with an air gun. The slurry coated monolith was calcined for about 1 hour at 540° C. The above-described dipping, blow-out and calcining steps were repeated until the monolith contained 1.5 g per cubic inch of monolith volume. This sample was designated Sample D.

EXAMPLE VI

Samples A, B, C and D were cut lengthwise into quarter sections and recombined to form a complete honeycomb monolith by cementing the quartered sections together with Sauereisen Number 8, a ceramic adhesive. Next, this combined monolith was put into the exhaust of a diesel engine and then evaluated according to the procedures set forth in Example I.

The results of the laboratory evaluations are presented in Table 3. Table 3 clearly shows that platinum dispersed on titania (Sample B) burns considerably more soot at 350° C. than platinum dispersed on alumina (Sample A). Table 3 also shows the unexpected results that titania (Sample D) is better at combusting diesel soot than alumina (Sample C) at 400° C. Thus, the combination of platinum and titania leads to the unexpected lowering of the diesel soot combustion temperature from 400° C. to 350° C.

TABLE 3

| | Diesel Soot Combustion Efficiency[a] | |
|---|---|---|
| | Efficiency[a] at Indicated Temperature | |
| | t = 350° C. | t = 400° C. |
| Sample A Pt on $Al_2O_3$ | 40% | 70% |
| Sample B Pt on $TiO_2$ | 77% | 95% |
| Sample C $Al_2O_3$ | 16% | 35% |
| Sample D $TiO_2$ | 16% | 60% |

[a]Efficiency is defined as the percentage of diesel soot combusted at the indicated temperature.

We claim as our invention:

1. A catalytic composite effective in reducing the ignition temperature of diesel soot in an exhaust gas from a diesel engine consisting essentially of a diesel soot filter selected from the group consisting of ceramic foam filter, monolithic honeycomb ceramic wall-flow filter, metallic mesh filter and metallic ribbon filter having deposited thereon at least one sulfur resistant refractory inorganic oxide selected from the group consisting of titania, zirconia, alumina treated with titania, alumina treated with zirconia, and mixtures thereof having deposited thereon at least one catalytic metal selected from the group consisting of Pt, Pd and Rh.

2. The catalyst of claim 1 where the diesel soot filter is a ceramic foam.

3. The catalyst of claim 1 where the diesel soot filter is a monolithic honeycomb ceramic wall flow filter.

4. The catalyst of claim 1 where the diesel soot filter is a metallic mesh or ribbon filter.

5. The catalyst of claim 1 where said refractory oxide is titania.

6. The catalyst of claim 1 where said refractory oxide is zirconia.

7. The catalyst of claim 1 where said catalytic element is platinum, and is present in a concentration of about 0.1 to about 4 weight percent of the inorganic oxide.

8. The catalyst of claim 1 where said catalytic metal is palladium and is present in a concentration of about 0.1 to about 4 weight percent of the inorganic oxide.

9. The catalyst of claim 1 where said catalytic metal is rhodium and is present in a concentration of about 0.03 to about 1.2 weight percent of the inorganic oxide.

10. The catalyst of claim 1 where said refractory inorganic oxide is present in a concentration from about 0.2 to about 3.5 g of oxide per cubic inch of volume of diesel soot filter.

* * * * *